(12) United States Patent
Mackie

(10) Patent No.: US 7,035,494 B1
(45) Date of Patent: Apr. 25, 2006

(54) SLOTTED MULTIMODE INTERFERENCE DEVICE

(75) Inventor: David M. Mackie, College Park, MD (US)

(73) Assignee: The United States of America as represented by the Secretary of the Army., Washington, DC (US)

( * ) Notice: Subject to any disclaimer, the term of this patent is extended or adjusted under 35 U.S.C. 154(b) by 53 days.

(21) Appl. No.: 10/854,414

(22) Filed: May 27, 2004

(51) Int. Cl.
G02B 6/26 (2006.01)

(52) U.S. Cl. .......................... 385/15; 385/14; 385/45; 385/129; 398/79

(58) Field of Classification Search ............ 385/14–17, 385/28, 45, 46, 129–132, 147, 40; 398/79
See application file for complete search history.

(56) References Cited

U.S. PATENT DOCUMENTS

| | | | |
|---|---|---|---|
| 5,640,474 A | 6/1997 | Tayag | 385/43 |
| 5,838,842 A | 11/1998 | Mackie | 385/11 |
| 5,852,691 A | 12/1998 | Mackie | 385/39 |
| 5,862,288 A * | 1/1999 | Tayag et al. | 385/129 |
| 6,178,276 B1 | 1/2001 | Mackie | 385/28 |
| 6,571,038 B1 * | 5/2003 | Joyner et al. | 385/40 |

OTHER PUBLICATIONS

Soldano, L. et al., "Optical Multi-Mode Interference Devices Based on Self-Imaging: Principles and Applications," Journal of Lightwave Technology, vol. 13, No. 4, pp. 615-627, Apr. 1995.

Lee, B. et al., "Integrated-optic, Lossless Beamsplitters," Proceedings of SPIE, vol. 4112, pp. 101-108, Jul. 2000.

Paiam, M.R. et al., "Compact Planar 980/1550-nm Wavelength Multi-Demultiplexer Based on Multimode Interference," IEEE Photonics Technology Letters, vol. 7, No. 10, pp. 1180-1182, Oct. 1995.

Kuykendall, D. et al., "Wavelength Division Multiplexing Coupler Based on Talbot Self-Imaging in Planar Optical Waveguides," Proceedings of the National Conference on Undergraduate Research, Apr. 1997.

Li, B. et al., "Low-Loss 1×2 Multimode Interference Wavelength Demultiplexer in Silicon-Germanium Alloy," IEEE Photonics Technology Letters, vol. 11, No. 5, pp. 575-577, May 1999.

Mackie, D. et al., "Polarization separation/combination based on self-imaging," Optical Engineering, vol. 40, No. 10, pp. 2265-2272, Oct. 2001.

(Continued)

*Primary Examiner*—Phan Palmer
(74) *Attorney, Agent, or Firm*—William V. Adams

(57) ABSTRACT

A multimode interference device and method of making the same comprises at least one input port, at least one output port, a multimode interference region separating the input port from the output port, and at least one subregion in the multimode interference region, wherein a self-image length within the multimode interference region is reduced by a factor that is approximately equal to one plus a number of subregions configured in the multimode interference region, wherein the at least one subregion is configured to have an effective width and effective refractive index running longitudinally through the multimode interference region. Additionally, the subregion may comprise at least one slot.

27 Claims, 10 Drawing Sheets

OTHER PUBLICATIONS

Lin, K. et al., "Guided-wave 1.3/1.55µm wavelength division multiplexer based on multimode interference," Electronics Letters, vol. 32, No. 14, pp. 1259-1261, Jul. 4, 1996.

Paiam, M.R. et al., "Polarisation-insensitive 980/1550 nm wavelength (de)multiplexer using MMI couplers," Electronics Letters, vol. 33, No. 14, pp. 1219-1220, Jul. 3, 1997.

Li, B. et al., "Guided-wave $Si_{1-x}Ge_x$/Si wavelength demultiplexer based on multimode interference," Infrared Physics & Technology, vol. 39, pp. 61-67, 1998.

Chuang, W. et al., "Integrated-Optics Multimode-Interference Wavelength Division Multiplexer for Optical Communication," Fiber and Integrated Optics, vol. 18, pp. 93-104, 1999.

Fish, G.A., et al., "Compact InGaAsP/InP 1×2 optical switch based on carrier induced suppression of modal interference," Electron. Lett. 33, No. 22, 1898-1899, Oct. 1997.

Zhao, P., et al., "Novel multimode coupler switch," Microwave and Optical Technol. Lett., 17, No. 1, 1-7, Jan. 1998.

El-Refaei H.H., et al., "Design of strip-loaded weak-guiding multimode interference structure for an optical router," IEEE J. Quantum Electron 34, No. 12, 2286-2290, Dec. 1998.

Nagai, S., et al., "InGaAsP/InP multi-mode interference photonic switches for monolithic integrated circuits," Jpn. J. Appl. Phys. 38, Pt. 1, No. 2B, 1269-1272 (1999).

Nagai, S., et al., "Mutimode interference photonic switches (MIPS)," J. Lightwave Technol. 20, No. 4, 675-681, Apr. 2002.

Chang, W.C., et al., "A novel multimode interference optoelectronic AND gate with partial index-modulation regions," in 2001 International Symposium on Electron Devices for Microwave and Optoelectronic Applications. EDMO 2001, Piscataway, NJ, 335-337, 2001 (abstract).

Tsao, S.L., et al., "An SOI X-crossing optical switch," in Solar and Switching Materials, Proc. SPIE 4458, 269-277, 2001.

Tsao, S.L., et al., "A novel wavelength switch with an 2×2 MMI SOI photonic crystal inside," in Materials and Devices for Photonic Crystals II, Proc. SPIE 4453, 162-169, 2001.

Lien, C.H., et al., "A compact photonic switch based on multimode interference with partial index-modulation regions," Microwave and Optical Technol. Lett. 33, No. 3, 174-176, May 5, 2002.

Ishida, K., et al., "InGaAsP/InP optical switches using carrier induced refractive index change," Appl. Phys. Lett. 50, No. 3, 141-142, Jan. 1987.

Ito, F., et al., "A carrier injection type optical switch in GaAs using free carrier plasma dispersion with wavelength range from 1.06 to 1.55 µm," IEEE J. Quantum Electron. 25, No. 7, 1677-1681, Jul. 1989.

Campbell, J.C., et al., "Electro optic multimode waveguide modulator or switch," J. Appl. Phys. 50, No. 10, 6149-6154, Oct. 1979.

Earnshaw, M.P., et al., "Semiconductor space switches based on multimode interference couplers," J. Lightwave Technol. 20, No. 4, 643-650, Apr. 2002.

* cited by examiner

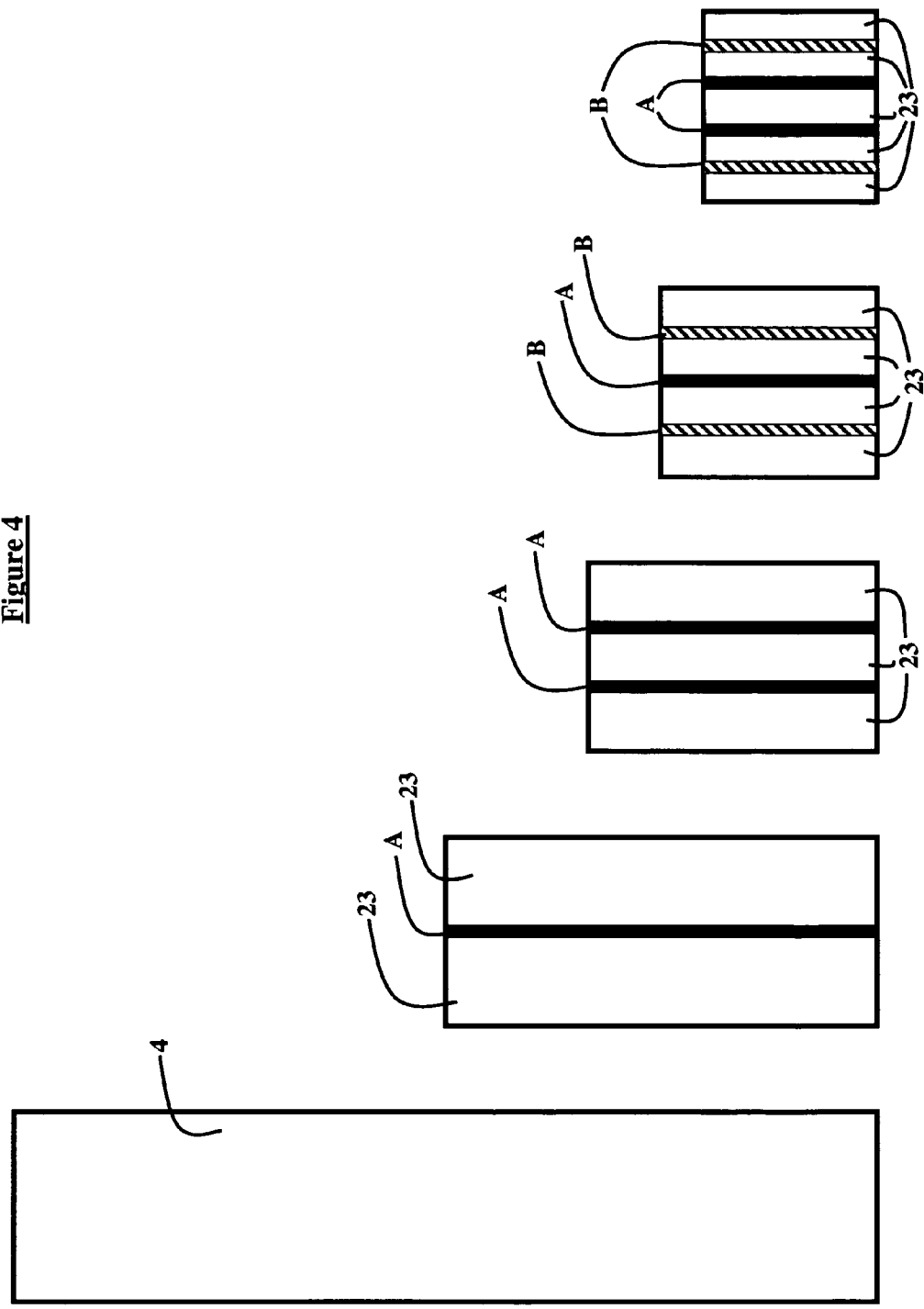

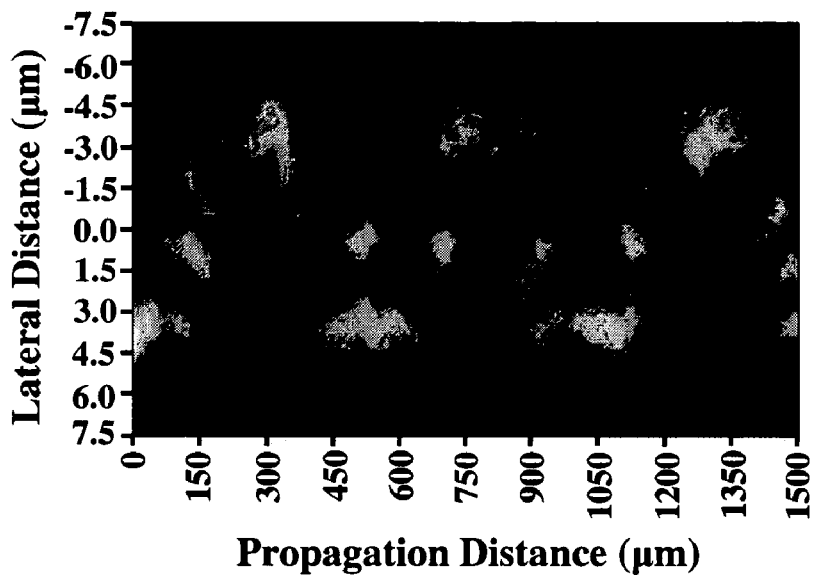
Figure 14(d)
Figure 15
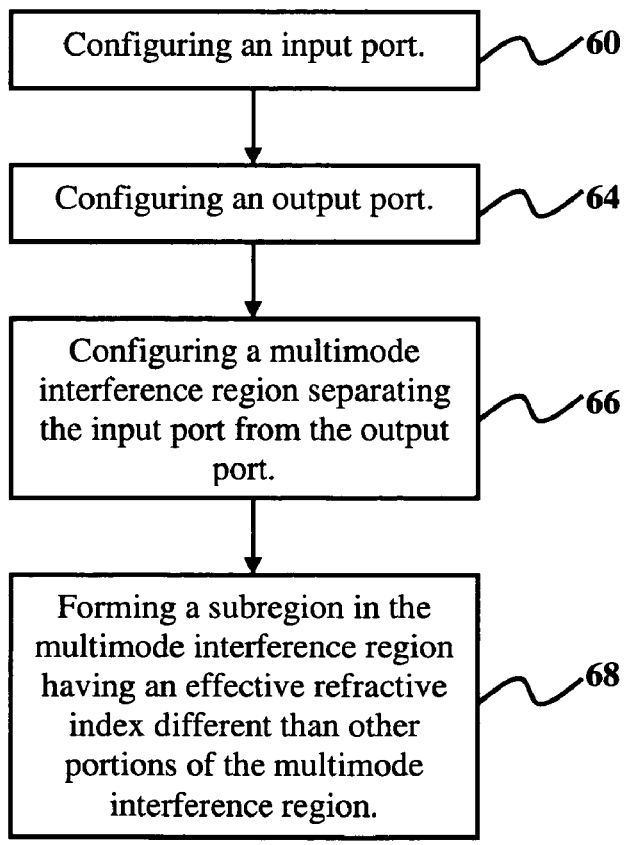

SLOTTED MULTIMODE INTERFERENCE DEVICE

GOVERNMENT INTEREST

The invention described herein may be manufactured, used, and/or licensed by or for the United States Government.

BACKGROUND OF THE INVENTION

1. Field of the Invention

The invention generally relates to integrated optical communications, and more particularly to a slotted multimode interference device for use in telecommunications, sensing, and related applications.

2. Description of the Related Art

Within this application several publications are referenced by Arabic numerals within brackets. Full citations for these publications may be found at the end of the specification immediately preceding the claims. The disclosures of all these publications in their entireties are hereby expressly incorporated by reference into the present application for the purposes of indicating the background of the invention and illustrating the general state of the art.

Multimode interference (MMI) devices are useful for the separation and combination of power of wavelengths or polarizations (SCWP) in integrated optic (IO) systems. However, like all SCWP devices, multimode interference devices can be rather long (geometrically), and thus take up more space on the integrated optical chip than is desirable. For example, wavelength separation/combination devices of 1.3 μm and 1.5 μm are required in the field of fiber optic communications to take advantage of embedded fiber optic systems of sizes of 1.3 μm and to proceed with the deployment of the lower loss 1.5 μm systems. Conventional devices rely on bulk optical filters and therefore suffer high insertion loss. As another example, polarization separation/combination devices are required for various IO and fiber optic sensing systems, such as optical gyroscopes and structural stress sensors. The self-imaging effect is a general property of light, therefore MMI devices do not have to be in IO.

Integrated optic devices are made according to photolithographic and microfabrication techniques. This allows for mass production, in the same way as for electrical integrated circuits. The most common electro-optic substrate materials for integrated optic devices are the semiconductors gallium arsenide and indium phosphide and lithium niobate, a ferroelectric insulating crystal. Lithium niobate is a strong, easily polished nonhydroscopic crystal, with a good electro-optic coefficient. It also has low optical transmission loss.

FIG. 1 illustrates a schematic perspective view of a conventional multimode interference-based SCWP device 1. The device 1 is single mode in the transverse (vertical) direction. The input/output waveguides 2, 3a/3b respectively, are single mode in the lateral (horizontal) direction also. The MMI region 4 supports many lateral modes. The input signal excites these modes, which propagate with different phase velocities down the length of the MMI region, and become de-phased. A self-image of the input 2 to the MMI region 4 forms when the superposition of the modes in the image plane again matches the original modal distribution at the input plane. This condition occurs at planes where the accumulated phase differences among the excited modes are integral multiples of $2\pi$, which allows the excited modes to constructively interfere and reproduce the input's modal distribution. The propagation distance at which this occurs is known as the self-image length, wherein the self-image length depends upon the polarization (either transverse electric, TE, or transverse magnetic, TM) and the wavelength ($\lambda$), in addition to other parameters.

A useful property of the self-imaging effect is that a lateral displacement of the input to the MMI region 4 along the object plane results in a corresponding displacement of the self-image along the image plane. This self-image displacement is antisymmetrical for the first self-image length (crossed). The second self-image is antisymmetrical to the first self-image, and thus symmetrically displaced relative to the input (barred). This continues, with odd-numbered self-images being antisymmetrically displaced (crossed), and even-numbered self-images being symmetrically displaced (barred).

In previous patents and publications[1-15], it has been shown that the dimensions of the MMI region 4 can be set such that the modes constructively interfere at the end of the region, forming a self-image of the TE (or $\lambda_1$) input signal at one output waveguide 3a and TM (or $\lambda_2$) at the other output waveguide 3b. Thus, the device 1 can separate two polarizations (or wavelengths) from one input 2 into two outputs 3a, 3b, each containing a different polarization (or wavelength). The device 1 can also work in reverse as a combiner. While MMI SCWP devices generally outperform other competing conventional techniques, they are still much longer than necessary or optimal, and some suffer from some performance limitations.

In other prior publications[16-29], it has been shown that introducing changes to the refractive index of portions of the MMI region 4 can drastically alter the self-imaging properties of the MMI device 1, allowing one to switch the light to either of the two outputs 3a, 3b. Most of these conventional devices[16-27] describe devices that require either large changes in the refractive index, or changes to large regions, or both, which limits the usefulness of the respective devices.

Therefore, due to the limitations of the conventional devices and processes, there remains a need for improvements to self-imaging waveguide devices for use in optical and related systems.

SUMMARY OF INVENTION

In view of the foregoing, an embodiment of the invention provides a multimode interference (MMI) device comprising at least one input port, at least one output port, a multimode interference region separating the input port from the output port, and at least one subregion in the multimode interference region, wherein a self-image length within the multimode interference region is reduced by a factor that is approximately equal to one plus a number of subregions configured in the multimode interference region, wherein the at least one subregion is configured to have an effective width and effective refractive index running longitudinally through the multimode interference region, wherein the subregion has an effective refractive index different from the remaining portions of the MMI region, and wherein the multimode interference region has alterable self-imaging properties.

The subregion may comprise a slot, which is created by removing material from the MMI region (thus making it a "slot" in the usual sense of the word), but the subregion could, in another embodiment, instead have its effective refractive index changed by a variety of other means. However, a "slot", as referred to in this application shall refer to the subregion of the MMI region having an effective refractive index different from the other portions of the MMI region, regardless of whether the slot is a slot in the traditional sense (i.e., material removed from the MMI region) or conversely the addition of material (i.e., a bump, etc.). Furthermore, the change in the effective refractive index may be an increase or a reduction. The input and output ports are most commonly connected to input and output waveguides which would lead to other devices. However, other devices could instead be connected to the ports directly. In a first embodiment, the at least one subregion is a single subregion centered in the multimode interference region, and the at least one input port and the at least one output port are positioned off-centered in relation to the multimode interference region.

According to another embodiment, the invention provides a method of manufacturing a multimode interference device, wherein the method comprises configuring at least one input port, configuring at least one output port, configuring a multimode interference region separating the input port from the output port, and forming a subregion in the multimode interference region, wherein a self-image length within the multimode interference region is reduced by a factor that is approximately equal to one plus a number of subregions configured in the multimode interference region, wherein the subregion is configured to have an effective width and effective refractive index running longitudinally through the multimode interference region, wherein the subregion has an effective refractive index different from the remaining portions of the MMI region, and wherein the multimode interference region has alterable self-imaging properties. In a first embodiment, the subregion comprises a single subregion, which may be embodied as a slot, centered in the multimode interference region. In a second embodiment, the subregion comprises a plurality of subregions, which may be embodied as slots. In another embodiment, the method comprises configuring a plurality of input and output ports, wherein the input port and the output port are positioned off-centered in relation to the multimode interference region. According to an embodiment of the invention, etching the multimode interference device forms the subregion(s). Alternatively, deposition processing forms the subregion(s). Alternatively, ion implantation forms the subregion(s). Still alternatively, applying a stimulus or stimuli to the multimode interference device forms the subregion(s), wherein the nature of the stimuli may be electrical, thermal, chemical, optical, and/or mechanical.

These, and other aspects and advantages of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

The invention will be better understood from the following detailed description of the preferred embodiments of the invention with reference to the drawings, in which:

FIG. 4 is a top view illustrating the effect on the MMI self-image length with the addition of slot(s);

FIG. 14(d) is a top view of a scanning electron microscopy representation illustrating the simulated field intensity through an MMI device with three evenly-spaced slots according to the invention, from the offset input to just beyond the fourth self-image; and FIG. 15 is a flow diagram illustrating a preferred method of the invention.

DETAILED DESCRIPTION OF PREFERRED EMBODIMENTS OF THE INVENTION

Figure 1:
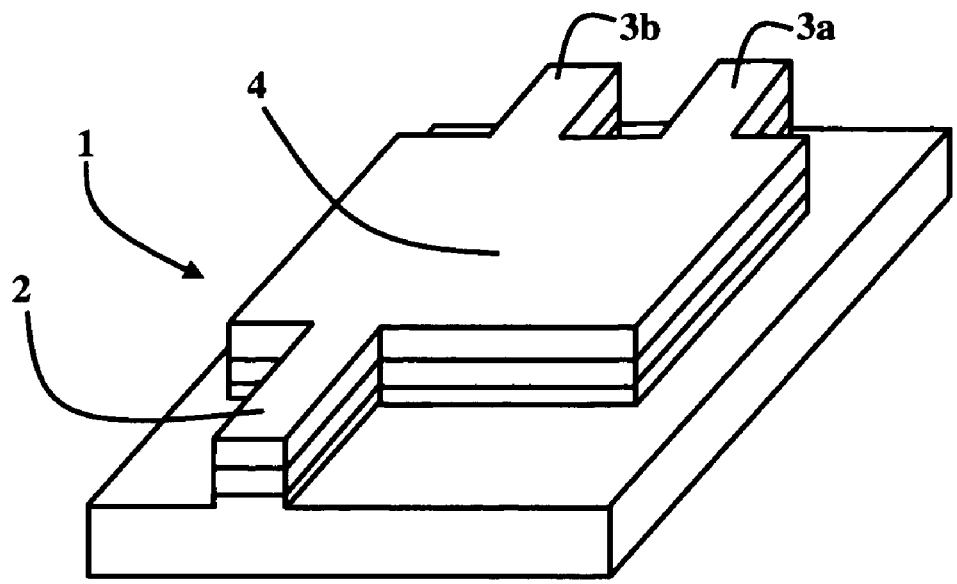
FIG. 1 is a schematic perspective view of a conventional multimode interference-based SCWP device.

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the invention. The examples used herein are intended merely to facilitate an understanding of ways in which the invention may be practiced and to further enable those of skill in the art to practice the invention. Accordingly, the examples should not be construed as limiting the scope of the invention.

As previously mentioned, there is a need for an improved self-imaging waveguide device and a method of manufacturing the same. Referring now to the drawings, and more particularly to FIGS. 2 through 15, there are shown preferred embodiments of the invention. For ease of understanding, in the several figures, 'A' refers to the center slot (center subregion), 'B' refers to the slots (subregions) on either side of 'A', 'C' refers to slots (subregions) on either side of 'B', etc., and the solid arrows represent the direction of light into and out of the device. However, it should be appreciated that (1) all of the slots shown in the various figures are not necessarily configured the same; (2) there is a mirror symmetry about the center of the MMI region 23; and (3) a 'B' slot in a 3-slot device is not the same as a 'B' slot in a 4-slot device or a 5-slot device, etc. The above-referenced slot identifications ('A', 'B', and 'C') are meant merely to distinguish the various slots from one another within a particular drawing and should not be read to constitute a limitation on the configuration of such slots.

Figure 2:
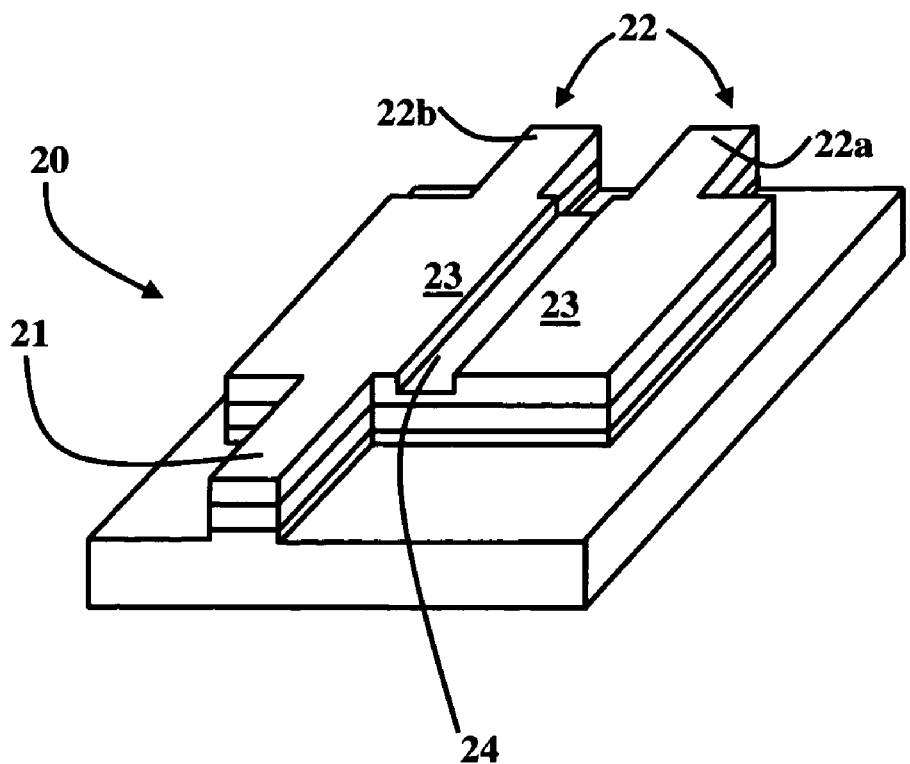
FIG. 2 is a schematic perspective view of a slotted multimode interference device according to the invention.

The invention provides a novel technique for reducing multimode interference self-image lengths, and thus the lengths of MMI-based devices, such as SCWP devices. The invention provides a subregion, which may be embodied as a slot (or multiple slots), of a specific width and effective refractive index, and at a specific position, which runs the longitudinal length of the MMI region. According to a preferred embodiment of the invention, FIG. 2 illustrates a multimode interference device 20 comprising an input port 21, an output port 22, a multimode interference region 23 separating the input port 21 from the output port 22, and a slotted region 24 dimensioned and configured in the multimode interference region 23. Additionally, a self-image length within the multimode interference region 23 is reduced by a factor that is approximately equal (for example, within 5%) to one plus a number of subregions 24 configured in the multimode interference region 23. Moreover, the slotted region 24 comprises an effective width and effective refractive index running longitudinally through the multimode interference region 23, and wherein the multimode interference region 23 has alterable self-imaging properties. Moreover, the slotted region 24 has an effective refractive index different from the remaining portions of the MMI region 23.

The output port 22 further comprises a crossed output waveguide 22a and a barred output waveguide 22b. A single centered slot 24 with the proper width and effective refractive index reduces the self-imaging length by a factor of approximately two, without adversely affecting the performance or fabricability of the device 20. The difference in refractive index between the MMI region 23 and the slot 24 may be formed by etching the slot 24 (as is shown in FIG. 2), or by etching everywhere in the MMI region 23 except the slot 24, by deposition of additional material in the slot 24, by deposition of additional material everywhere in the MMI region 23 except the slot 24, by use of the electro-optic effect, or by some other means. Those skilled in the art will recognize a variety of other methods used to define the waveguides 21, 22, the MMI region 23, and the slot 24.

The usefulness of the invention and the improvement to the art provided by the invention are demonstrated by investigating the correlation between slot dimensions and output, and by analyzing the optimization of length and throughput. As is indicated below, the feasibility of fabricating a slotted MMI device according to the invention is demonstrated by analyzing the allowable margins of error.

Although more than one self-image length is used to create SCWP devices, for the fabricability analysis only the first self-image length is discussed herein for ease of comparison, and to prevent unnecessary repetition. In the calculated results, unless otherwise stated, the MMI region width is 10 µm. The input/output waveguides 21, 22 are centered 2.5 µm from the edge of the MMI region 23. The experimental calculations are based on the modal propagation analysis (MPA), and on the beam propagation method (BPM), with both using the effective index method (EIM) to reduce the calculations to two dimensions. (These types of calculations are well-known in the field of integrated optics. Brief explanations can be found in references [6] and [11], along with further references). The effective index of refraction of the waveguide (including the MMI region 23), $n_{region}$, is 3.0, with a lowered effective index of refraction for the slot, $n_{slot}$. All areas outside of the waveguides are known as the lateral region. The effective refractive index of the lateral region, $n_{lat}$, is set to 1.0, which indicates use of a very deep etch known as a pedestal etch. However, other etching techniques may be employed by the invention. The pedestal etch is used in the calculations presented because it allows for a small bend radii and thus is often used when one is trying to make small devices. The wavelength of the light is 1 µm. The input/output field distribution is modeled as a Gaussian distribution with a full-width half-maximum of 1 µm, which corresponds to input/output waveguide widths of 4 µm. Generally, wider inputs/outputs increase throughput, which is desirable, but can increase crosstalk if made too wide, which is undesirable. The values used here are not critical. They are simply intermediate values that provide good throughput while keeping crosstalk very low.

Figure 3:
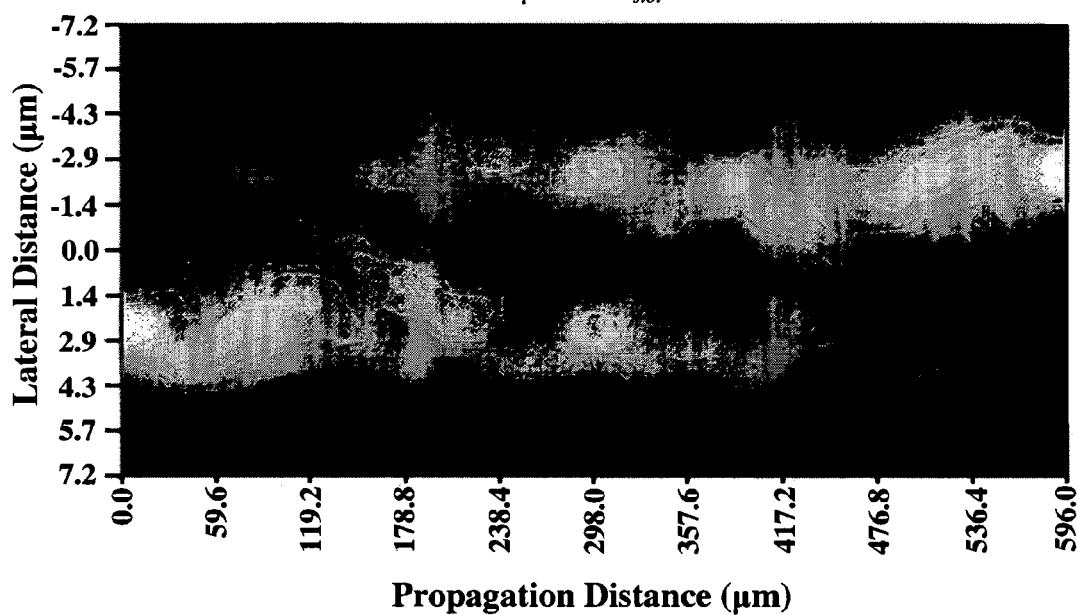
FIG. 3 is a top view of a scanning electron microscopy representation illustrating the simulated field intensity through an MMI device with a single centered slot from the offset input to the first self-image according to the invention.

FIG. 3 is a top view of the calculated field intensity through an MMI device with a single centered slot according to the invention, from the offset input to the first self-image. In this plot, $n_{slot}$ has been set to the correct value, determined empirically, such that the self-image length is halved. (In this case, $n_{slot}$ is reduced slightly from $n_{region}$. It could have also been increased slightly to achieve essentially the same effect.)

It is well-known to those familiar with MMI devices (see reference [6], for example) that the self-image length for standard MMI devices with off-center inputs is given by:

$$L = 4\frac{W^2 n_{region}}{\lambda},$$

where W is the effective width. W can be closely approximated by the physical width for devices in which there is a large difference between $n_{region}$ and $n_{lat}$, such as pedestal-etched devices. Thus the example device of FIG. 3, as a standard device without the slot, would have a length of 1200 µm. Clearly, the slot has reduced the self-image length by a factor of approximately two, even though modal interference is still taking place throughout the entire MMI region. FIG. 4 illustrates a general reduction of the MMI self-image length due to the effect of adding slots.

Figure 5A:
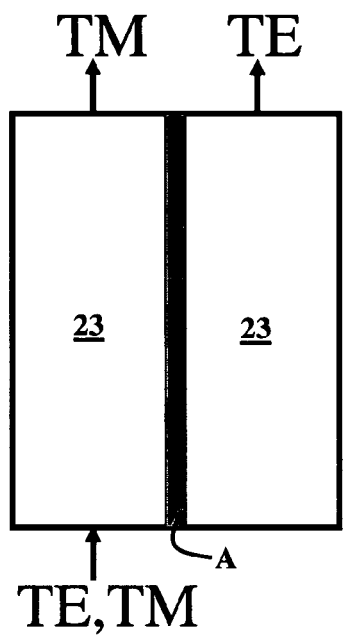
FIG. 5(a) is a top view of polarization splitter device according to the invention.
Figure 5B:
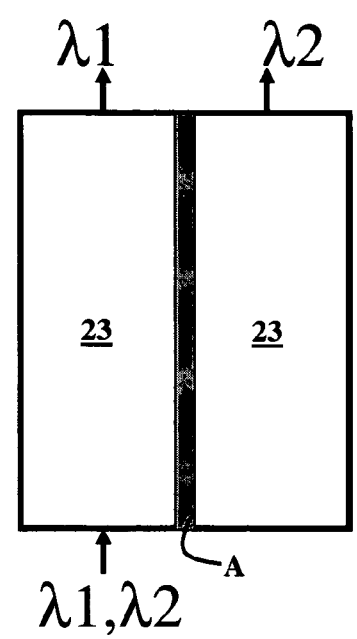
FIG. 5(b) is a top view of a wavelength splitter device according to the invention.

Examples of the application of a single slot to SCWP devices are shown schematically in the top views in FIGS. 5(a) and 5(b). A polarization splitter is shown in FIG. 5(a) and a wavelength splitter is shown in FIG. 5(b) for wavelengths λ1 and λ2. Each device is one-half the length of the corresponding standard (unslotted) MMI SCWP device. Of course, each device can be used in reverse as a combiner.

This effect of a single slot has been used previously to design integrated optical switches (i.e., devices that allow one to control whether light entering the input port of the MMI will exit from the crossed output port or from the barred output port). Conventional approaches discuss such single-slotted MMI switches for the case of increased values for $n_{slot}$.[28] Recently, this concept has been extended to the case of decreased values for $n_{slot}$.[29] Crucially, neither of these conventional approaches nor any other conventional approach indicates that slotted MMI devices are more general than single-slotted MMI switches with a varying value of $n_{slot}$. That is, the effect of multiple slots, the possible usefulness of slotted MMI devices for anything but switches, and the possibility of switching by varying the width or depth of the slot(s) are entirely absent from the prior art literature.

The throughput of a device is the power at the output port (or in the output waveguide), normalized by the power at the input port (or in the input waveguide). Ideally, one wants the throughput to be unity (i.e., 1.0), indicating that no power has been lost from the system due to the device in question. Conventional solutions indicated that throughput would degrade unless the slot were kept rather narrow.[28] Other solutions use a wider slot, but indicate that there is something special or unique about the width used.[29] Conversely, the calculations of the present invention indicate otherwise. According to the invention, for all slot widths, the throughput does not noticeably decrease for the best values of $n_{slot}$ except for slots wider than 1.0 µm, which interfere with the input/output 21, 22. The difference in results is because, for each slot width, the best value of $n_{slot}$ is determined empirically by optimization to maximize the throughput. In contrast, the conventional solutions[28, 29] use rather simple equations, which are derived in reference [28] using approximations that are not quite valid. These equations are useful for giving one a physical "feel" for what is happening and for finding starting points for the optimization (and according to the invention, it will be shown herein that they can be extended to multiple slots), but the conventional approaches should not be used for final designs or conclusions about the behavior of slotted MMI devices, as they are incomplete at best.

Figure 13A:
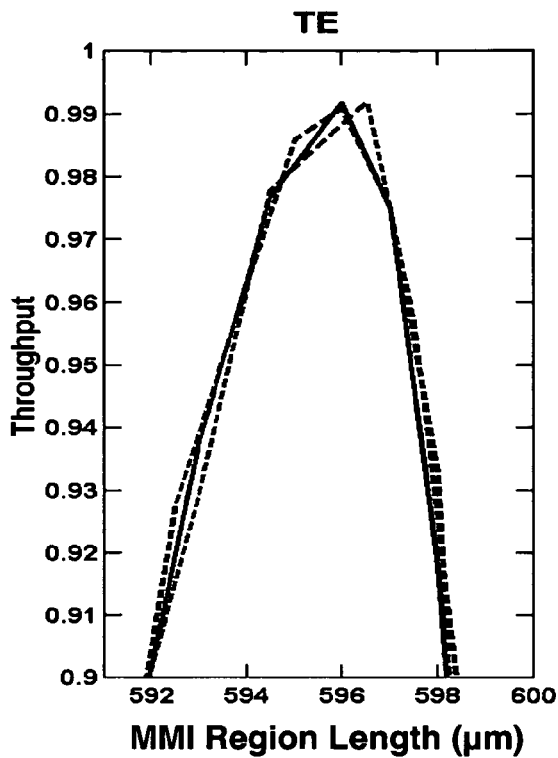
FIG. 13(a) is a graphical illustration showing the sensitivity of the throughput to the slot width error with a transverse electric polarization according to the invention.
Figure 13B:
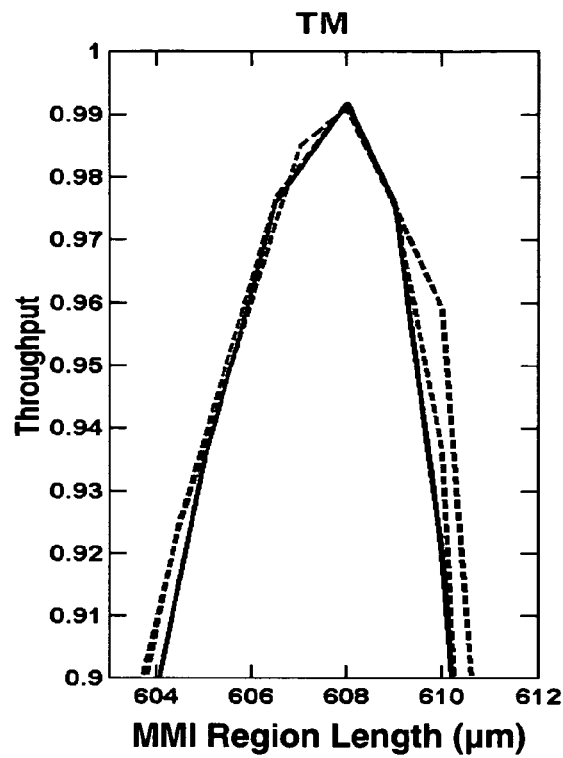
FIG. 13(b) is graphical illustration showing the sensitivity of the throughput to the slot width error with a transverse magnetic polarization according to the invention.

According to the invention, in order to determine fabricability, the effect of a 10% fabrication error in the slot width is calculated, while keeping all other parameters fixed. This is performed for slot widths of 0.1 µm, 0.5 µm, and 1.0 µm. In all cases, the resulting change in the throughput is determined to be not large enough to significantly degrade the functionality of the device. As an example of the results, FIGS. 13(a) and 13(b) illustrate the sensitivity results for a slot width of 0.5 µm. The slot width error for this case is ±50 nm. The solid curve corresponds to the correct value of slot width, while the two slotted curves correspond to the incorrect values. The differing self-imaging length for TE and TM polarizations that is seen here is a standard feature of MMI devices that is well-known in the prior art. The throughput responses for the other two cases are similar, indicating that the important parameter for fabricability is relative error rather than absolute error. Thus, a wider slot will have a larger allowable absolute error in the slot width, and will be easier to fabricate to the necessary tolerance in order to provide the required throughput.

As another test of fabricability, $n_{slot}$ is varied about its best value (i.e., the value that yields maximum throughput), while keeping the other parameters fixed. This is performed for slot widths of 0.1 µm, 0.5 µm, and 1.0 µm. In all cases, the device is able to tolerate a large relative error. For example, for a slot width of 0.5 µm, even a large relative error (±20%) in the change of n, $n_{region}-n_{slot}$, only reduces the throughput from 99% to 97%. Hereinafter, $n_{region}-n_{slot}$ is referred to as δn. Again, the throughput responses for the other two cases are similar, indicating that the important parameter for fabricability is relative error in δn rather than absolute error. Thus, a slot with a larger δn will have a larger allowable absolute error in δn, and will be easier to fabricate to the necessary tolerance in order to provide the required throughput. However, because larger δn implies smaller slot width, this means that there is a tradeoff in fabricability; narrow slots have a large absolute tolerance for δn but a small absolute tolerance for slot width, while wide slots have a small absolute tolerance for δn but a large absolute tolerance for slot width. For applications of slotted MMI devices in which the slot parameters are fixed at fabrication, such as SCWP devices, one should therefore preferably pick a medium slot width and a medium δn.

Figure 6A:
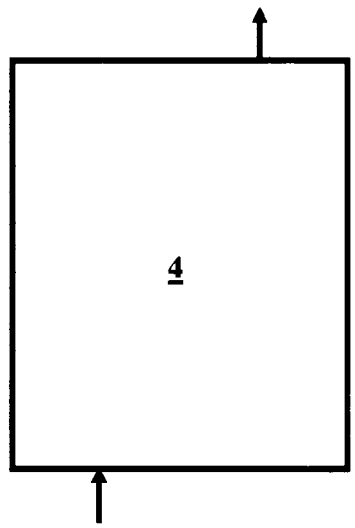
FIG. 6(a) is a top view of a single-slotted crossed output MMI switch.
Figure 6B:
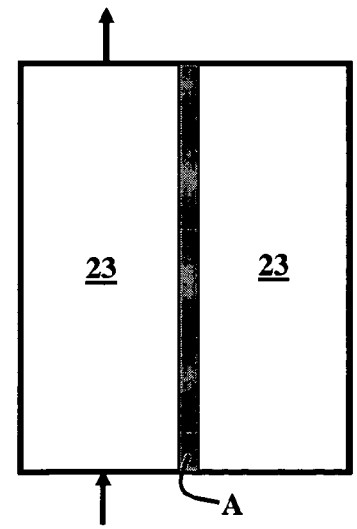
FIG. 6(b) is a top view of a single-slotted barred output MMI switch according to the invention.

On the other hand, the fabricability tradeoff can be advantageously used to make a switch. When the slot is wide, the value of $n_{slot}$ approximates the value of $n_{region}$. This means that a small absolute change in either $n_{slot}$ or $n_{region}$ has a large effect on the behavior of the device 20. This can be used as the basis of a slotted MMI cross-bar switch. Thus, if $n_{slot}$ is equal to $n_{region}$ the device 20 will behave as a standard MMI device 1. If the MMI region 23 length is set to the self-imaging length, then the output will be crossed. That is (referring to FIG. 2), an optical signal will enter the MMI device 20 at input port 21, traverse the MMI region 23 while interacting with the slotted region 24, and will exit at the output port 22a. However, if either $n_{slot}$ or $n_{region}$ is changed slightly so that their difference is set to the correct value that causes halving of the self-image length, then (for very nearly the same MMI region length) the output will be barred. In this case, an optical signal will enter the MMI device 20 at input port 21, traverse the MMI region 23 while interacting with the slotted region 24, and will exit at the output port 22b. This index change can be brought about by a variety of methods well-known in the IO prior art, such as the electro-optic effect, the thermo-optic effect, strip-loading due to adhesion of reactants to a surface coating, microelectromechanical systems (MEMS), etc. The simplest version of this type of slotted MMI switch, in which switching is obtained by changing $n_{slot}$ of a single slot via the electro-optic effect, is known in the art.[28, 29] FIGS. 6(a) and 6(b) illustrate a schematic top-view of a singly-slotted MMI switch in operation, with FIG. 6(a) showing crossed output with the slot off and FIG. 6(b) showing barred output with the slot on.

Conversely, when the slot 24 is narrow, the behavior of the device 20 is sensitive to absolute changes in the slot width. Thus, changing the slot width of a narrow slot can also be used as the basis of a cross-bar switch. The width change can be brought about by a variety of methods well-known in the 10 prior art, such as bulk heating or MEMS.

Figure 9A:
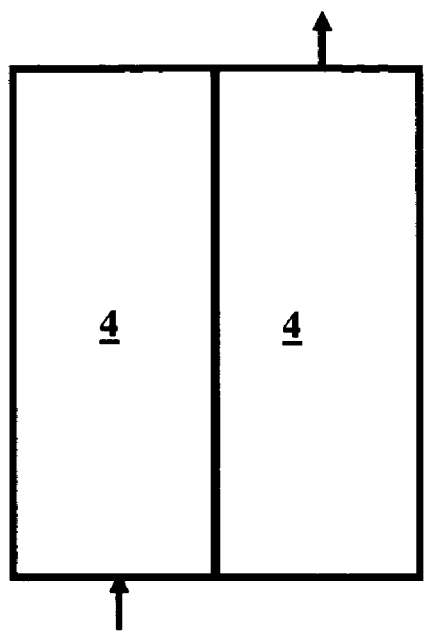
FIG. 9(a) is a top view of a horizontal MEMS slotted crossed output MMI switch.
Figure 9B:
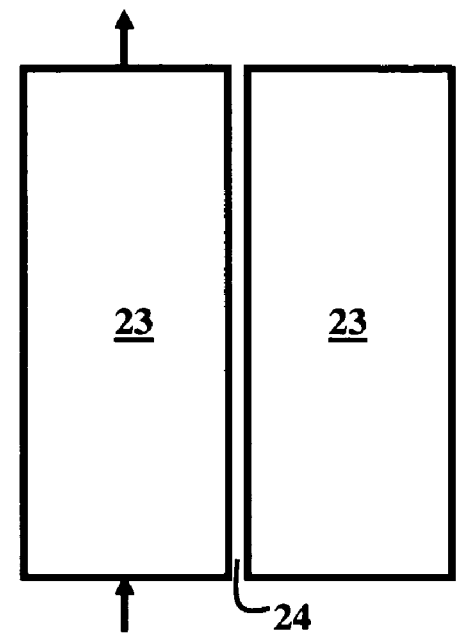
FIG. 9(b) is a top view of a horizontal MEMS slotted barred output MMI switch according to the invention.
Figure 10A:
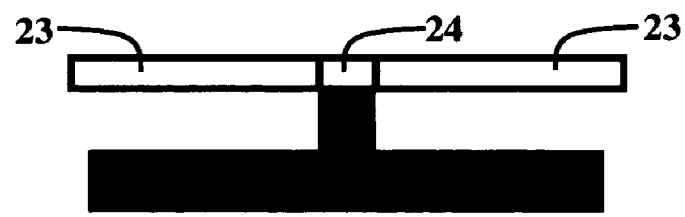
FIG. 10(a) is an end view of a vertical MEMS slotted crossed output MMI switch according to the invention.
Figure 10B:
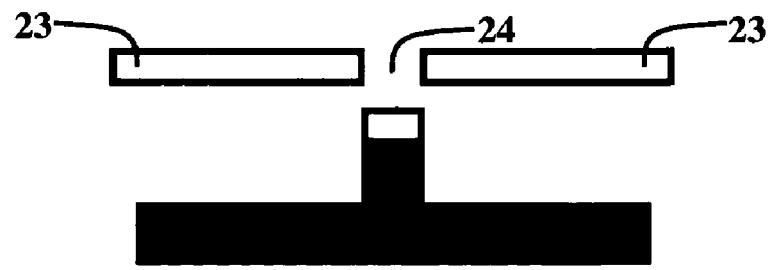
FIG. 10(b) is an end view of a vertical MEMS slotted barred output MMI switch according to the invention.

Several examples of MEMS slotted MMI switches are shown schematically in FIGS. 9 and 10. FIGS. 9(a) and 9(b) illustrate a switch in which the MEMS acts horizontally, moving half of the MMI region. In the closed position shown in FIG. 9(a), there is no slot and, with the MMI length set to the first self-image length for a standard MMI device, the output is crossed. In the open position shown in FIG. 9(b), there is a single slot in the MMI region, so the self-image length is halved. The light self-images twice within the MMI region (for the same MMI region length), and the output is barred. Moreover, the distance required for the MEMS to move in this slotted-MMI device is much smaller than would be required if the switching device relied upon total internal reflection from the slot. That is, in the latter case, the slot would need to be much wider, placing greater demands upon the MEMS aspect of the device. FIGS. 10(a) and 10(b) illustrate a switch (in an end-on view) in which the MEMS acts vertically, moving a piece of the waveguide. In the closed position shown in FIG. 10(a), there is no slot and, with the MMI length set to the first self-image length for a standard MMI device, the output is crossed. In the open position shown in FIG. 10(b), there is a single slot in the MMI region, so the self-image length is halved. The light self-images twice within the MMI region (for the same MMI region length), and the output is barred. Furthermore, the size of the waveguide piece required for the MEMS to move in this slotted-MMI device is much smaller than would be required if the switching device relied upon total internal reflection from the slot. That is, in the latter case, the slot would need to be much wider and therefore more massive, thereby placing greater demands upon the MEMS aspect of the device. Additionally, the vertical distance required for the MEMS to move is not large, since the waveguide thickness is usually less than the light wavelength.

Figure 11A:
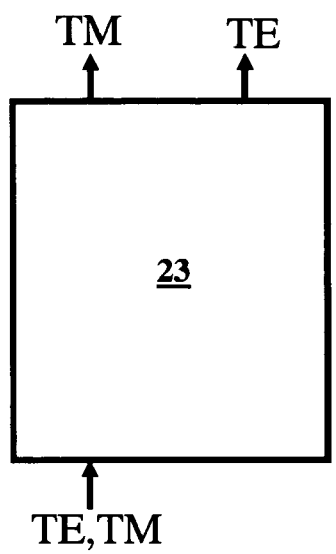
FIG. 11(a) is a top view of a polarization splitter device with a slot off according to the invention.
Figure 11B:
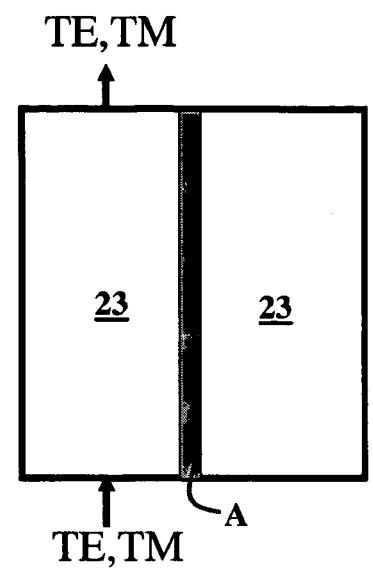
FIG. 11(b) is a top view of a polarization splitter device with a slot on according to the invention.
Figure 12A:
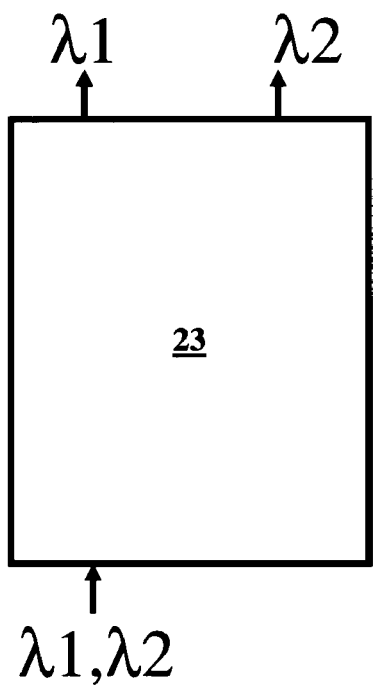
FIG. 12(a) is a top view of a wavelength splitter device with a slot off according to the invention.
Figure 12B:
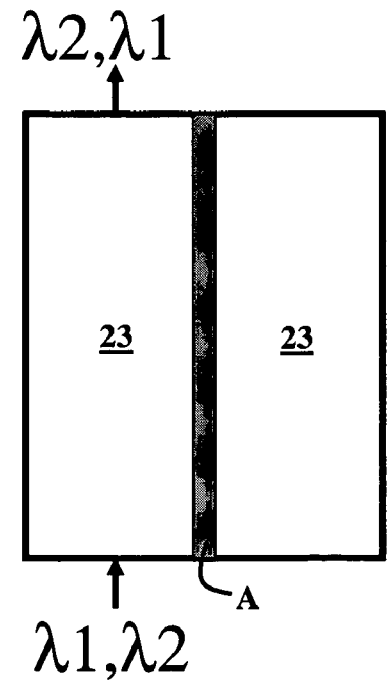
FIG. 12(b) is a top view of a wavelength splitter device with a slot on according to the invention.

Combination SCWP and switch devices are also possible. FIGS. 11 and 12 illustrate schematic top views of two examples of such devices. FIGS. 11(a) and 11(b) illustrate a switching polarization splitter, in which the device acts as a polarization splitter with the slot turned off as shown in FIG. 11(a), but passes both polarizations to the barred output with the slot turned on as shown in FIG. 11(b). FIGS. 12(a) and 12(b) illustrate a similar device for wavelengths λ1 and λ2. It is a switching wavelength splitter, in which the device acts as a wavelength splitter with the slot turned off shown in FIG. 12(a), but passes both wavelengths to the barred output with the slot turned on shown in FIG. 12(b). The principle of both devices is the same: activating the slot halves the self-image length. Therefore, a device that is a splitter with the slot off will, with the slot on, instead first split in the first half of the MMI region and then recombine in the second half of the MMI region.

Figure 14A:
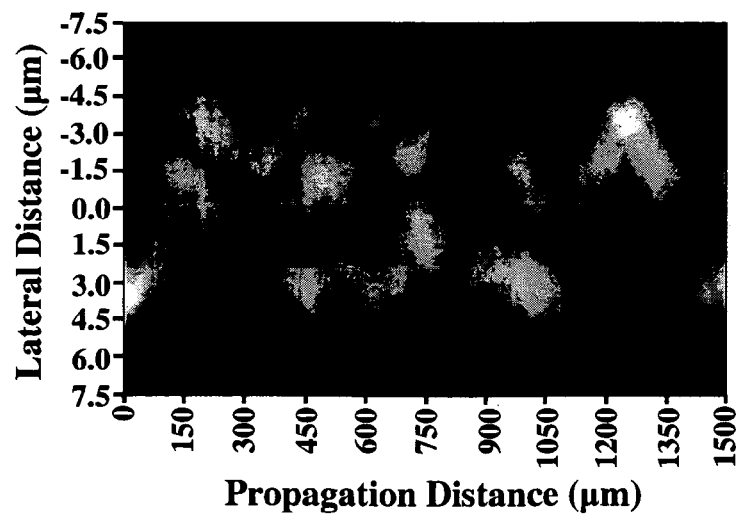
FIG. 14(a) is a top view of a scanning electron microscopy representation illustrating the simulated field intensity through a conventional MMI device with no slot, from the offset input to just beyond the first self-image.
Figure 14B:
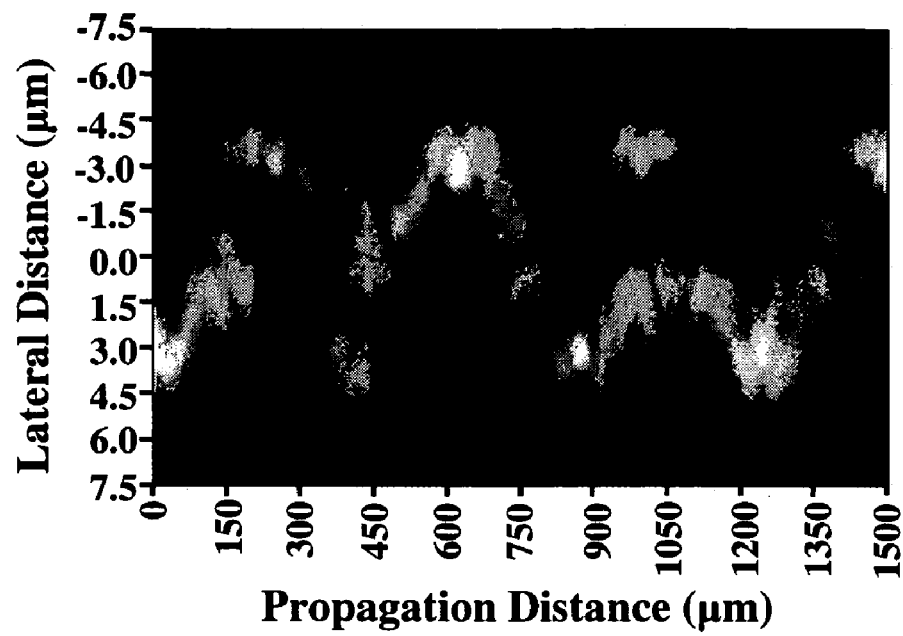
FIG. 14(b) is a top view of a scanning electron microscopy representation illustrating the simulated field intensity through an MMI device with a single centered slot according to the invention, from the offset input to just beyond the second self-image.
Figure 14C:
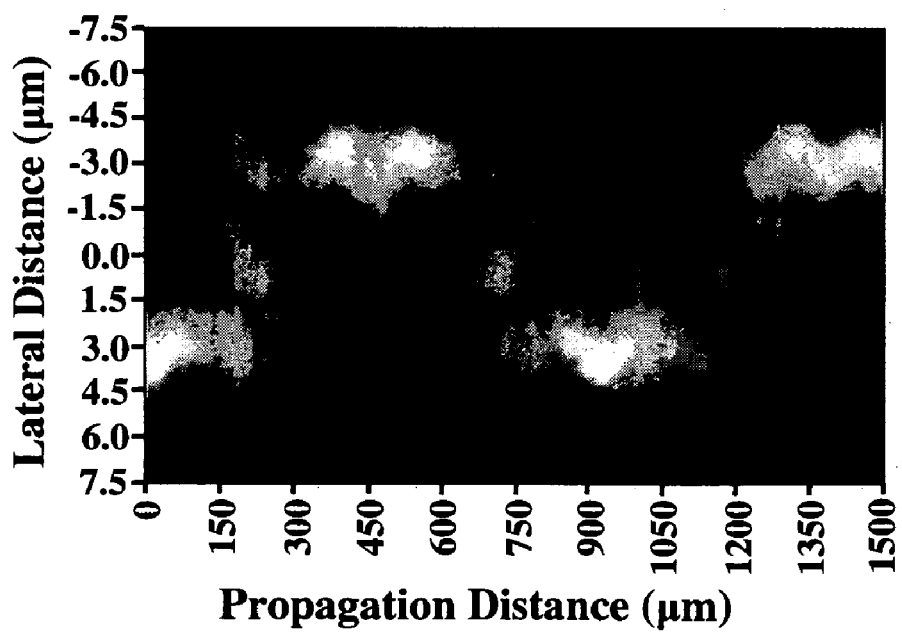
FIG. 14(c) is a top view of a scanning electron microscopy representation illustrating the simulated field intensity through an MMI device with two evenly-spaced slots according to the invention, from the offset input to just beyond the third self-image.

As mentioned above, multiple slots may also be used. FIGS. 14(a) through 14(d), which show top views of the simulated field intensity through MMI devices for identical propagation distances, illustrate the effect of introducing additional slots. FIG. 14(a) is for a conventional MMI device with no slot. The view is from the offset input to just beyond the first self-image. FIG. 14(b) is for an MMI device with a single centered slot according to the invention. The same propagation distance now includes the second self-image. FIG. 14(c) is for an MMI device with two evenly-spaced slots according to the invention. The same propagation distance now includes the third self-image. FIG. 14(d) is for an MMI device with three evenly spaced slots according to the invention. The same propagation distance now includes the fourth self-image. Thus, for N slots, the self-image length is decreased by a factor of approximately N+1. This is shown schematically in FIG. 4. The throughput generally decreases for increasing numbers of slots. However, the slot parameters can often be set to optimize the throughput for a specific self-image or set of self-images. This can be seen in the N=2 case shown in FIGS. 2 and 14(c), where the throughput for all barred self-images is approximately 95% even though the throughput for the crossed self-images (including the first self-image) is only approximately 85%.

When designing a slotted MMI device with more than two slots, the slots should preferably not all have the same effective refractive index and width. As each mode of the MMI region propagates, it acquires a modal phase delay given by:

$$\phi_m = \frac{\pi p^2 z}{L_0},$$

where p is the mode number, z is the propagation distance, and $L_0$ is the self-image length for the unslotted MMI region. For slotted MMI regions, each mode also acquires an extra phase delay due to the slots. This extra phase delay depends upon z, δn (the difference in effective refractive index between the slot region and the rest of the MMI region), the slot width, and the value of the mode across the slots. One can approximate the last parameter as the value of the mode at the centers of the slots. In fact, the extra phase delay from a slot will be zero for modes that have nodes (i.e., are zero) at that slot position.

Self-imaging occurs whenever the difference in total phase delay between all successive modes is either an odd multiple of π (inverted self-imaging), or an even multiple of π (non-inverted self-imaging). Several examples are provided below to clarify the procedure. First, consider the simplest case of a standard MMI region (i.e., no slot). For $z=L_0$, one obtains the following table of delays:

TABLE 1

| Phase delays for the case of no slot and $z = L_0$ | | | | | | | | |
| --- | --- | --- | --- | --- | --- | --- | --- | --- |
| | p | | | | | | | |
| Delays (π) | 1 | 2 | 3 | 4 | 5 | 6 | 7 | 8 |
| Modal | 1 | 4 | 9 | 16 | 25 | 36 | 49 | 64 |
| Difference | n/a | 3 | 5 | 7 | 9 | 11 | 13 | 15 |

Next, consider the case of a single slotted MMI region. For $z=L_0/2$, one obtains the following table of delays:

TABLE 2

Phase delays for the case of one slot and $z = L_0/2$

| Delays ($\pi$) | 1 | 2 | 3 | 4 | 5 | 6 | 7 | 8 |
|---|---|---|---|---|---|---|---|---|
| Modal | 1/2 | 4/2 | 9/2 | 16/2 | 25/2 | 36/2 | 49/2 | 64/2 |
| From slot | A | 0 | A | 0 | A | 0 | A | 0 |
| Total | A + 1/2 | 4/2 | A + 9/2 | 16/2 | A + 25/2 | 36/2 | A + 49/2 | 64/2 |
| Difference | n/a | 3/2 − A | 5/2 + A | 7/2 − A | 9/2 + A | 11/2 − A | 13/2 + A | 15/2 − A |

Using algebraic calculations, one can obtain the results that A=1/2 will give differences of 1, 3, 3, 5, 5, 7, 7, . . . and A=−3/2 will give differences of 3, 1, 5, 3, 7, 5, 9, . . . , which shows there are both positive and negative values of δn that will result in self-imaging for an MMI region that is half of the standard self-image length. One can do additional theoretical work to determine the approximate value of δn from the value of A, but in practice it is easier just to vary δn in a computer program being used to model the slotted MMI device.

Next, consider the case of a double slotted MMI region. For $z=L_0/3$, one obtains the following table of delays:

TABLE 3

Phase delays for the case of two slots and $z = L_0/3$

| Delays ($\pi$) | 1 | 2 | 3 | 4 | 5 | 6 | 7 | 8 |
|---|---|---|---|---|---|---|---|---|
| Modal | 1/3 | 4/3 | 9/3 | 16/3 | 25/3 | 36/3 | 49/3 | 64/3 |
| From slots | A | A | 0 | A | A | 0 | A | A |
| Total | A + 1/3 | A + 4/3 | 9/3 | A + 16/3 | A + 25/3 | 36/3 | A + 49/3 | A + 64/3 |
| Difference | n/a | 1 | 5/3 − A | 7/3 + A | 3 | 11/3 − A | 13/3 + A | 5 |

After some additional algebraic calculations, one can obtain the results that A=2/3 will give differences of 1, 1, 3, 3, 3, 5, 5, . . . and A=−4/3 will give differences of 1, 3, 1, 3, 5, 3, 5, . . . , which shows there are both positive and negative values of δn that will result in self-imaging for an MMI region that is one-third of the standard self-image length.

Next, consider the case of a triple slotted MMI region. For $z=L_0/4$, one obtains the following table of delays:

TABLE 4

Phase delays for the case of three slots and $z = L_0/4$

| Delays ($\pi$) | 1 | 2 | 3 | 4 | 5 | 6 | 7 | 8 |
|---|---|---|---|---|---|---|---|---|
| Modal | 1/4 | 4/4 | 9/4 | 16/4 | 25/4 | 36/4 | 49/4 | 64/4 |
| From slots | A + B | 2B | A + B | 0 | A + B | 2B | A + B | 0 |
| Total | A + B + 1/4 | 2B + 4/4 | A + B + 9/4 | 16/4 | A + B + 25/4 | 2B + 36/4 | A + B + 49/4 | 64/4 |
| Difference | n/a | B − A + 3/4 | A − B + 5/4 | −A − B + 7/4 | A + B + 9/4 | B − A + 11/4 | A − B + 13/4 | − A − B + 15/4 |

It is noteworthy that there are two types of slot delay, because the center slot is distinguishable from the two off-center slots. The center slot contributes delay A; the off-center slots each contribute a delay B. Every fourth mode has nulls at all slot positions, and thus gets zero slot delay. Even modes not divisible by 4 have nulls at the center, so they get no A delay, but they have maxima at both off-center slots, so they get two full B delays. Odd modes are maximum at zero, so they get a full A delay, but only have a value of $1/\sqrt{2}$ at the position of the off-center slots, so they get half of a B delay from each off-center slot for a total of one B delay. After some algebraic calculations, one finds that all odd-phase differences result from the following combinations (among others) of A and B: 1/4, 1/2; 5/4, −1/2; 1/4, −3/2; and −3/4, −1/2. This demonstrates that there are a variety of combinations of both positive and negative values of δn that will result in self-imaging for an MMI region that is one-fourth of the standard self-image length.

Solutions have also been obtained for slot delays that result in self-imaging for slotted MMI devices with 4 slots and 5 slots (at propagation distances of $L_0/5$ and $L_0/6$, respectively). The algebraic calculations become more complicated, but the procedure is essentially the same as shown above for 1, 2, and 3 slots. These calculations have been confirmed with MPA and BPM calculations. The same algebraic procedure works for any number of slots; however, as the number of slots increases, the required delay from some slots will become large enough to invalidate the assumption that the "no-slot" modes are unperturbed to first order. Thus, in practice there is a limit to the length reduction possible in slotted MMI devices. This limit will depend upon the particular parameters of the device under investigation, but a reduction factor of approximately 10 is most likely the upper limit for most cases of interest.

The application of multiple slots to SCWP devices is a straightforward extension of the application of a single slot to SCWP devices. Examples of the application of multiple slots to switching devices are shown schematically in FIGS.

Figure 7A:
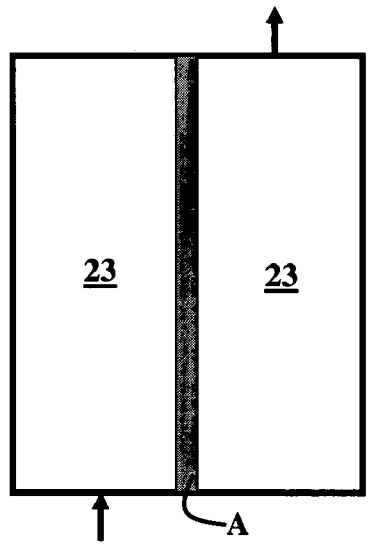
FIG. 7(a) is a top view of a three-slotted crossed output MMI switch according to the invention.
Figure 7B:
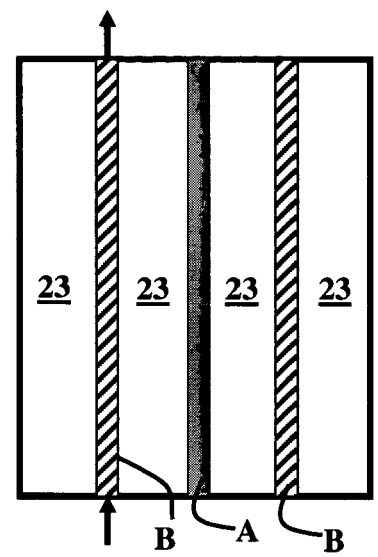
FIG. 7(b) is a top view of a three-slotted barred output MMI switch according to the invention.
Figure 8A:
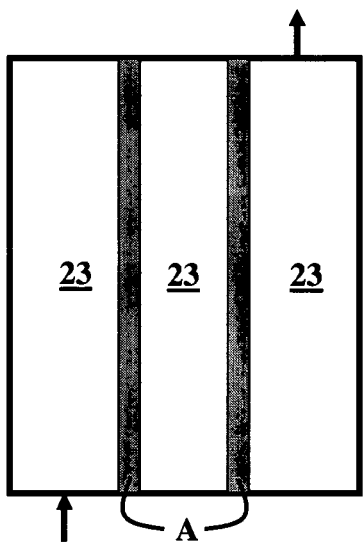
FIG. 8(a) is a top view of a five-slotted crossed output MMI switch according to the invention.
Figure 8B:
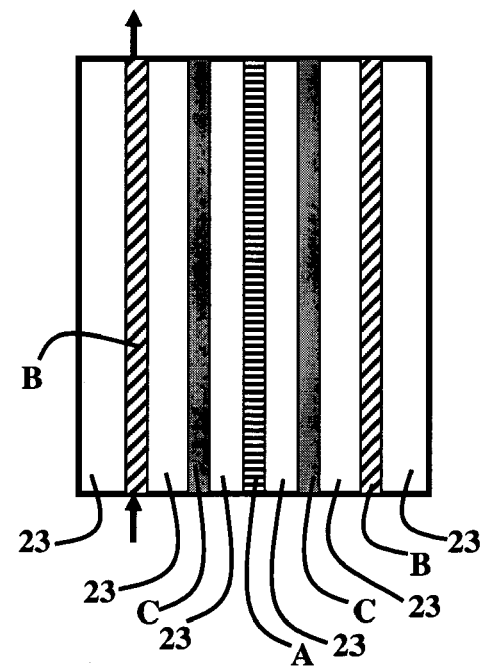
FIG. 8(b) is a top view of a five-slotted barred output MMI switch according to the invention.

7 and 8. FIGS. 7(a) and 7(b) illustrate a three-slotted MMI switch with one permanent slot down the center of the MMI region and two switchable slots centered at approximately ±W/4. The exact locations of slots can be varied slightly to optimize performance. With the switchable slots off as shown in FIG. 7(a), and the length of the MMI region set to the first self-image length for a single-slotted device, one obtains crossed output. With the switchable slots on as shown in FIG. 7(b), the self-image length is halved, and one obtains barred output. This device is one-half the length of a single-slotted MMI switch. FIGS. 8(a) and 8(b) illustrate a similar device, but with five slots. Two of the slots, centered at approximately ±W/6, are permanent. The other three slots, centered at 0 and approximately ±W/3, are switchable. A switchable slot is a slot that is switched on and off. For example, an applied voltage can change the refractive index in the slot region to make a slot, but if the voltage is turned off then the index of the slot region is the same as the index of the rest of the MMI region, and so there is no slot. In contrast, a permanent slot is not turned on and off, either because one always keeps it on or because a permanent change has been made to the device (e.g., an etch or a deposition).

With the switchable slots off as shown in FIG. 8(a), and the length of the MMI region set to the first self-image length for a doubly-slotted device, one obtains crossed output. With the switchable slots on as shown in FIG. 8(b), the self-image length is halved, and one obtains barred output. This device is 1/3 the length of a single-slotted MMI switch. This concept can be extended to switches with 7 slots, 9 slots, 11 slots, etc., although at some point (depending on the application) the extra reduction in length is not efficient due to the penalties in device complexity and performance, as indicated above.

Therefore, a slot 24 with optimal parameters in the MMI region 23 halves the self-image length, while the throughput performance suffers only slightly. The best throughput of an unslotted device (FIG. 14(a)) is experimentally shown to be 99.7%, compared to 99.3% for a single slotted device (FIG. 14(b)). Multiple slots may be used, in which case the length reduction is by a factor that is approximately equal to one plus the number of slots.

According to another embodiment shown in the flow diagram of FIG. 15, the invention provides a method of manufacturing a multimode interference device 20, wherein the method comprises configuring 60 an input port 21, configuring 64 an output port 22, configuring 66 a multimode interference region 23 separating the input port 21 from the output port 22, and forming 68 a subregion 24 in the multimode interference region 23 having an effective refractive index different from other regions of the multimode interference region 23. Additionally, a self-image length within the multimode interference region 23 is reduced by a factor that is approximately equal to one plus a number of subregions 24 configured in the multimode interference region 23. Furthermore, the subregion 24 is configured to have an effective width and effective refractive index running longitudinally through the multimode interference region 23, and the multimode interference region 23 has alterable self-imaging properties, which means that the subregion 24 in the MMI region 23 alters the self-imaging properties of the MMI region 23.

In a first embodiment, the subregion 24 comprises a single slot 24 centered in the multimode interference region. In a second embodiment, the slotted region 24 comprises a plurality of slots. In another embodiment, the method comprises configuring a plurality of input (not shown) and output ports 22a, 22b, wherein the input port and the output ports are positioned off-centered in relation to the multimode interference region 23. According to an embodiment of the invention, the subregion 24 is formed by etching the multimode interference device 20. Alternatively, the subregion 24 is formed by deposition processing. Still alternatively, the subregion 24 is formed by applying a stimulus to the multimode interference device 20, wherein the stimulus is any of an electrical stimulus, a thermal stimulus, a chemical stimulus, an optical stimulus, and a mechanical stimulus.

The invention is advantageous over the conventional devices and methods because the invention reduces the length of a MMI SCWP device without significantly reducing device performance. That is, the MMI device 20 of the invention is substantially shorter than standard MMI devices, and because of the novel slot 24 in the MMI region 23, the invention is able to achieve shorter lengths. In fact, the device 20 with one slot 24 as provided by the invention is half the length of a standard MMI device. Moreover, in another embodiment, the device provided by the invention is 1/(N+1) times the length of a standard MMI device, wherein N is the number of slots 24 in the device 20. Furthermore, the slotted MMI region 23 is a novel concept, which has many useful applications in IO and other fields.

Most of the conventional devices[16-27] describe devices that operate on fundamentally different principles from those described by the invention. Furthermore, the conventional devices require either large changes in the refractive index, or changes to large regions, or both, which makes them less useful than the devices provided by the invention. Other devices[28-29] describe switching devices that are the simplest versions of more-general switching devices. However, no other prior device describes a generally-applicable means of reducing the self-image length of any MMI device with an off-center input by introducing changes to the refractive index of portions of the MMI region, as does the invention.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

REFERENCES

[1] U.S. Pat. No. 5,640,474 issued Jun. 17, 1997 (Tayag).
[2] U.S. Pat. No. 5,838,842 issued Nov. 17, 1998 (Mackie).
[3] U.S. Pat. No. 5,852,691 issued Dec. 22, 1998 (Mackie).
[4] U.S. Pat. No. 5,862,288 issued Jan. 19, 1999 (Tayag et al.).
[5] U.S. Pat. No. 6,178,276 issued Jan. 23, 2001 (Mackie).
[6] Soldano, L. et al., "Optical Multi-Mode Interference Devices Based on Self-Imaging: Principles and Applications," Journal of Lightwave Technology, Vol. 13, No. 4, pp. 615–627, April 1995.
[7] Lee, B. et al., "Integrated-optic, Lossless Beamsplitters," Proceedings of SPIE, Vol. 4112, pp. 101–108, July 2000.
[8] Paiam, M. R. et al., "Compact Planar 980/1550-nm Wavelength Multi-Demultiplexer Based on Multimode Interference," IEEE Photonics Technology Letters, Vol. 7, No. 10, pp. 1180–1182, October 1995.

[9] Kuykendall, D. et al., "Wavelength Division Multiplexing Coupler Based on Talbot Self-Imaging in Planar Optical Waveguides," Proceedings of the National Conference on Undergraduate Research, April 1997.

[10] Li, B. et al., "Low-Loss 1×2 Multimode Interference Wavelength Demultiplexer in Silicon-Germanium Alloy," IEEE Photonics Technology Letters, Vol. 11, No. 5, pp. 575–577, May 1999.

[11] Mackie, D. et al., "Polarization separation/combination based on self-imaging," Optical Engineering, Vol. 40, No. 10, pp. 2265–2272, October 2001.

[12] Lin, K. et al., "Guided-wave 1.3/1.55 µm wavelength division multiplexer based on multimode interference," Electronics Letters, Vol. 32, No. 14, pp. 1259–1261, Jul. 4, 1996.

[13] Paiam, M. R. et al., "Polarisation-insensitive 980/1550 nm wavelength (de)multiplexer using MMI couplers," Electronics Letters, Vol. 33, No. 14, pp. 1219–1220, Jul. 3, 1997.

[14] Li, B. et al., "Guided-wave $Si_{1-x}Ge_x/Si$ wavelength demultiplexer based on multimode interference," Infrared Physics & Technology, Vol. 39, pp. 61–67, 1998.

[15] Chuang, W. et al., "Integrated-Optics Multimode-Interference Wavelength Division Multiplexer for Optical Communication," Fiber and Integrated Optics, Vol. 18, pp. 93–104, 1999.

[16] Fish, G. A., et al., "Compact InGaAsP/InP 1×2 optical switch based on carrier induced suppression of modal interference," Electron. Lett. 33, No. 22, 1898–1899, October 1997.

[17] Zhao, P., et al., "Novel multimode coupler switch," Microwave and Optical Technol. Lett., 17, No. 1, 1–7, Jan. 1998.

[18] El-Refaei H. H., et al., "Design of strip-loaded weak-guiding multimode interference structure for an optical router," IEEE J. Quantum Electron 34, No. 12, 2286–2290, December 1998.

[19] Nagai, S., et al., "InGaAsP/InP multi-mode interference photonic switches for monolithic photonic integrated circuits," Jpn. J. Appl. Phys. 38, Pt. 1, No. 2B, 1269–1272 (1999).

[20] Nagai, S., et al., "Multimode interference photonic switches (MIPS)," J. Lightwave Technol. 20, No. 4, 675–681, April 2002.

[21] Tsao, S. L., et al., "Design of a 2*2 MMI MZI SOI electro-optic switch covering C band and L band," Microw. Opt. Technol. Lett. 33, No. 4, 262–265, May 20, 2002.

[22] Chang, W. C., et al., "A novel multimode interference optoelectronic AND gate with partial index-modulation regions," in 2001 International Symposium on Electron Devices for Microwave and Optoelectronic Applications. EDMO 2001, Piscataway, N.J., 335–337, 2001.

[23] Tsao, S. L., et al., "An SOI X-crossing optical switch," in Solar and Switching Materials, Proc. SPIE 4458, 269–277, 2001.

[24] Tsao, S. L., et al., "A novel wavelength switch with an 2×2 MMI SOI photonic crystal inside," in Materials and Devices for Photonic Crystals II, Proc. SPIE 4453, 162–169, 2001.

[25] Lien, C. H., et al., "A compact photonic switch based on multimode interference with partial index-modulation regions," Microwave and Optical Technol. Lett. 33, No. 3, 174–176, May 5, 2002.

[26] Ishida, K., et al., "InGaAsP/InP optical switches using carrier induced refractive index change," Appl. Phys. Lett. 50, No. 3, 141–142, January 1987.

[27] Ito, F., et al., "A carrier injection type optical switch in GaAs using free carrier plasma dispersion with wavelength range from 1.06 to 1.55 µm," IEEE J. Quantum Electron. 25, No. 7, 1677–1681, July 1989.

[28] Campbell, J. C., et al., "Electro-optic multimode waveguide modulator or switch," J. Appl. Phys. 50, No. 10, 6149–6154, October 1979.

[29] Earnshaw, M. P., et al., "Semiconductor space switches based on multimode interference couplers," J. Lightwave Technol. 20, No. 4, 643–650, April 2002.

What is claimed is:

1. A multimode interference device comprising:
   at least one input port;
   at least one output port;
   a multimode interference region separating said input port from said output port; and
   at least one slot dimensioned and configured in said multimode interference region having an effective refractive index different from other regions of said multimode interference region,
   wherein a self-image length within said multimode interference region is reduced by a factor that is approximately equal to one plus a number of slots configured in said multimode interference region.

2. The multimode interference device of claim 1, wherein said at least one slot is configured to have an effective width and effective refractive index running longitudinally through said multimode interference region.

3. The multimode interference device of claim 1, wherein said multimode interference region has alterable self-imaging properties.

4. The multimode interference device of claim 1, wherein said at least one slot comprises a single slot centered in said multimode interference region.

5. The multimode interference device of claim 1, wherein said at least one input port and said at least one output port are positioned off-centered in relation to said multimode interference region.

6. A multimode interference device comprising:
   at least one input port;
   at least one output port;
   a multimode interference region separating said input port from said output port; and
   at least one subregion dimensioned and configured in said multimode interference region having an effective refractive index different from other regions of said multimode interference region, wherein said at least one subregion is further configured to have an effective width and effective refractive index running longitudinally through said multimode interference region;
   wherein a self-image length within said multimode interference region is reduced by a factor that is approximately equal to one plus a number of subregions configured in said multimode interference region.

7. The multimode interference device of claim 6, wherein said at least one input port and said at least one output port are positioned off-centered in relation to said multimode interference region.

8. The multimode interference device of claim 6, wherein said multimode interference region has alterable self-imaging properties.

9. The multimode interference device of claim 6, wherein said at least one subregion comprises a single slot centered in said multimode interference region.

10. The multimode interference device of claim 6, wherein said at least one subregion comprises a plurality of slots.

11. The multimode interference device of claim 6, further comprising a plurality of input ports.

12. The multimode interference device of claim 6, further comprising a plurality of output ports.

13. A method of manufacturing a multimode interference device, said method comprising:
- configuring at least one input port;
- configuring at least one output port;
- configuring a multimode interference region separating said input port from said output port; and
- forming at least one subregion in said multimode interference region having an effective refractive index different from other regions of said multimode interference region, wherein said at least one subregion is further configured to have an effective width and effective refractive index running longitudinally through said multimode interference region;
- wherein a self-image length within said multimode interference region is reduced by a factor that is approximately equal to one plus a number of subregions configured in said multimode interference region.

14. The method of claim 13, wherein said at least one subregion is formed by applying a stimulus to said multimode interference device.

15. The method of claim 14, wherein said stimulus is an electrical stimulus.

16. The method of claim 14, wherein said stimulus is a thermal stimulus.

17. The method of claim 14, wherein said stimulus is a chemical stimulus.

18. The method of claim 14, wherein said stimulus is an optical stimulus.

19. The method of claim 14, wherein said stimulus is a mechanical stimulus.

20. The method of claim 13, wherein said configuring at least one output port comprises configuring a plurality of output ports.

21. The method of claim 13, wherein said at least one input port and said at least one output port are positioned off-centered in relation to said multimode interference region.

22. The method of claim 13, wherein said at least one subregion is formed by etching said multimode interference device.

23. The method of claim 13, wherein said at least one subregion is formed by deposition processing.

24. The method of claim 13, wherein said multimode interference region has alterable self-imaging properties.

25. The method of claim 13, wherein said forming at least one subregion comprises forming a single slot centered in said multimode interference region.

26. The method of claim 13, wherein said forming at least one subregion comprises forming a plurality of slots.

27. The method of claim 13, wherein said configuring at least one input port comprises configuring a plurality of input ports.

* * * * *